United States Patent
Yoshida

[11] Patent Number: 5,963,436
[45] Date of Patent: Oct. 5, 1999

[54] SWITCHING POWER SUPPLY APPARATUS AND CONTROLLING METHOD FOR THE SAME

[75] Inventor: Koji Yoshida, Hirakata, Japan

[73] Assignee: Matsushita Electric Industrial Co., Ltd., Osaka, Japan

[21] Appl. No.: 09/152,020

[22] Filed: Sep. 11, 1998

[30] Foreign Application Priority Data

Sep. 12, 1997 [JP] Japan .................................. 9-248056

[51] Int. Cl.⁶ .................................................. H02M 3/335
[52] U.S. Cl. ................................ 363/17; 363/98; 363/132
[58] Field of Search ................................. 363/16, 17, 95, 363/98, 131, 132

[56] References Cited

U.S. PATENT DOCUMENTS

| | | | |
|---|---|---|---|
| 4,504,895 | 3/1985 | Steigerwald | 363/17 |
| 4,737,974 | 4/1988 | Hino et al. | 378/105 |
| 4,758,941 | 7/1988 | Felton et al. | 363/17 |
| 4,864,479 | 9/1989 | Steigerwald et al. | 363/98 |
| 5,132,889 | 7/1992 | Hitchcock et al. | 363/17 |
| 5,157,592 | 10/1992 | Walters | 363/17 |
| 5,406,051 | 4/1995 | Lai | 219/130.1 |
| 5,438,498 | 8/1995 | Ingemi | 363/17 |
| 5,486,993 | 1/1996 | Sakurai et al. | 363/98 |
| 5,568,368 | 10/1996 | Steigerwald et al. | 363/17 |
| 5,838,558 | 11/1998 | Tan et al. | 363/91 |
| 5,875,103 | 2/1999 | Bhagwat et al. | 363/17 |
| 5,877,947 | 3/1999 | Chen et al. | 363/53 |
| 5,886,884 | 3/1999 | Baek et al. | 363/48 |

FOREIGN PATENT DOCUMENTS

| | | | |
|---|---|---|---|
| 0 147 698 A2 | 7/1985 | European Pat. Off. | H02M 3/337 |
| 0 173 445 A2 | 3/1986 | European Pat. Off. | H02M 7/5387 |
| 0 595 232 A2 | 5/1994 | European Pat. Off. | H02M 7/5387 |
| 0 625 820 A2 | 11/1994 | European Pat. Off. | H02M 3/337 |
| WO 93/08636 | 4/1993 | WIPO | H02M 7/5387 |

*Primary Examiner*—Adolf Deneke Berhane
*Attorney, Agent, or Firm*—Sheridan Ross P.C.

[57] ABSTRACT

The switching power supply apparatus of the present invention comprises first and second switching units connected to a DC power source and connected to each other serially, third and fourth switching units connected to the DC power source and connected to each other serially, and a transformer including a primary winding connected to between a connecting point between the first and second switching units and a connecting point between the third and fourth switching units, wherein the first and second switching units is controlled so that the first and second switching units are in an ON-state complementarily after a first predetermined dead time period in which both of the first and second switching units are in an OFF-state, the third and fourth switching units is controlled so that the third and fourth switching units are in the ON-state complementarily after a second predetermined dead time period in which both of the third and fourth switching units are in the OFF-state, and the first through fourth switching units are controlled so that a short-circuited time in which the primary winding is short-circuited is set between the first and second dead time periods.

7 Claims, 5 Drawing Sheets

SWITCHING POWER SUPPLY APPARATUS AND CONTROLLING METHOD FOR THE SAME

BACKGROUND OF THE INVENTION

The present invention relates to a switching power supply apparatus to be used to supply a DC voltage to an electronic apparatus and a controlling method for the same.

In recent years, in addition to lower price and down-sizing prerequisites, high performance and energy saving prerequisites have been strongly demanded for industrial and consumer electronic apparatuses. According to such prerequisites, it is also demanded for a switching power supply apparatus for use to supply a DC voltage to the electronic apparatus to be smaller in size, more stable in output operation, and high efficiency.

Hereafter, a conventional switching power supply apparatus will be described with reference to FIG. 4 showing an equivalent circuit diagram of a conventional switching power supply apparatus.

As shown in FIG. 4, this conventional switching power supply apparatus includes a full bridge converter and a DC power source 51 is connected to the input terminals 52a and 52b of the switching power supply apparatus. In the concrete, a positive electrode of the DC power source 51 is connected to the input terminal 52a, and a negative electrode of the DC power source 51 is connected to the input terminal 52b. The DC power source 51 supplies a predetermined input voltage Vin to the input terminals 52a and 52b.

The conventional switching power supply apparatus comprises a first switching element 53, a second switching element 54 connected serially to the first switching element 53, a third switching element 55, a fourth switching element 56 connected serially to the third switching element 55, and a control circuit 57 used to control the first through fourth switching elements 53 . . . 56.

One end of each of the first and third switching elements 53 and 55 is connected to the input terminal 52a, and one end of each of the second and fourth switching elements 54 and 56 is connected to the input terminal 52b. Each of the first through fourth switching elements 53 . . . 56 includes a parasitic capacitance connected to the corresponding element in parallel. That is, as shown in FIG. 4, the first parasitic capacitance 58 grows across the first switching element 53 in parallel, and the second parasitic capacitance 59 grows across the second switching element 54 in parallel. Similarly, the third parasitic capacitance 60 grows across the third switching element 55 in parallel, and the fourth parasitic capacitance 61 grows across the fourth switching element 56 in parallel.

The control circuit 57 receives a DC output voltage Vout generated at both ends of a smoothing capacitor 66 (to be described later), and controls a ratio of an ON-period and an OFF-period of each of the first through fourth switching elements 53 . . . 56 in order to stabilize the output voltage Vout. In the concrete, the control circuit 57 outputs control signals g1 and g2 to the respective first and second switching elements 53 and 54 in a manner that each of the first and second switching elements 53 and 54 repeats becoming the ON-state and the OFF-state alternately. Furthermore, the control circuit 57 outputs a control signal g3 to the third switching element 55 in a manner that the third switching element 55 repeats the ON-state and the OFF-state at the same timing as that of the second switching element 54. Further, the control circuit 57 outputs the control signal g4 to the fourth switching element 56 in a manner that the fourth switching element 56 repeats becoming ON-state and the OFF-state at the same timing as that of the first switching timing 53.

The conventional switching power supply apparatus is provided with a transformer 62 comprises the above-mentioned full bridge converter in addition to the first through fourth switching elements 53 . . . 56. The transformer 62 comprises a primary winding 62a, and first and second secondary windings 62b and 62c. The primary winding 62a is connected to the primary side of the full bridge converter. That is, one end of the primary winding 62a is connected to a connecting point between the first and second switching elements 53 and 54, and the other end of the primary winding 62a is connected to a connecting point between the third and fourth switching elements 55 and 56. The first and second secondary windings 62b and 62c are connected in series each other. The primary winding 62a, and the first and second secondary windings 62b and 62c are set to a turn ratio of n:1:1.

First and second rectifying diodes 63 and 64 are connected to both ends of the serially-connected first and second secondary windings 62b and 62c, respectively. An inductance element 65 and a smoothing capacitor 66 are serially connected to a connecting point between the first and second rectifying diodes 63 and 64 in that order. A load 68 is connected across both ends of the smoothing capacitor 66 via respective output terminals 67a and 67b. Specifically, an anode of the first rectifying diode 63 is connected to one end of the first secondary winding 62b, and an anode of the second rectifying diode 64 is connected to one end of the second secondary winding 62c. Cathodes of the first and second rectifying diodes 63 and 64 are connected to each other, and at the connecting point between those cathodes is connected one end of the inductance element 65.

The other end of the inductance element 65 is connected to one end of the smoothing capacitor 66. One end of the smoothing capacitor 66 is connected to an output terminal 67a, and the other end is connected to an output terminal 67b. Consequently, the first and second rectifying diodes 63 and 64 rectify an induced voltage generated in the first and second secondary windings 62b and 62c, respectively. The smoothing capacitor 66 smooths a rectified induced voltage, and outputs a smoothed induced voltage to the load 68 via the output terminals 67a and 67b as the output voltage Vout. Since the smoothing capacitor 66 is given an electrostatic capacity enough to smooth the induced voltage from the inductance element 65 and output the smoothed voltage as the output voltage Vout.

Operation of this conventional switching power supply apparatus will be described with reference to FIGS. 4 and 5.

FIG. 5 is a waveform chart showing a pulse waveform of each control signal, and voltage and current waveforms at operating condition of the conventional switching power supply apparatus shown in FIG. 4. In (a) through (j) of FIG. 5, abscissa is graduated with time. In (a) through (j) of FIG. 5, the respective waveforms are drawn with their timing positions (represented by vertical broken lines) in agreement with each other.

In (a) through (d) of FIG. 5, the pulse waveforms indicate the control signals g1 . . . g4, respectively. A voltage V51 in (e) of FIG. 5 indicates the waveform of a voltage applied to the second switching element 54. A voltage V52 in (f) of FIG. 5 indicates the waveform of a voltage applied to the fourth switching element 56. A voltage V5t in (g) of FIG. 5 indicates the waveform of a voltage applied to the primary winding 62a. A current I5t in (h) of FIG. 5 indicates the waveform of a current flowing in the primary winding 62a. A current I51 in (i) of FIG. 5 indicates the waveform of a current flowing in a parallel circuit of the first switching element 53 and the first parasitic capacitance 58.

A current I52 in (j) of FIG. 5 indicates the waveform of a current flowing in a parallel circuit of the second switching element 54 and the second parasitic capacitance 59.

The control circuit 57 outputs the control signals g1 and g4 to the respective first and fourth switching elements 53 and 56 at a timing T50 of FIG. 5, so that the first and fourth switching elements 53 and 56 are in the ON-state concurrently. Consequently, the input voltage Vin is applied to the primary winding 62a, so that the induced voltage (Vin/n) is generated in the first secondary winding 62b. As a result, the first rectifying diode 63 is in a conductive state, and the second rectifying diode 64 is in a non-conductive state. The inductance element 65 receives a voltage (Vin/n−Vout) because the output voltage Vout is already applied to the inductance element 65 from the smoothing capacitor 66.

On the other hand, the current I51 in (i) of FIG. 5 is the sum of an exciting current of the transformer 62 and a converted component current, which is the component such that an exciting current of the inductance element 65 is converted into the current flowing through the primary winding 62a, and passes through the first switching element 53.

Subsequently, the control circuit 57 outputs the control signals g1 and g4 to the respective first and fourth switching elements 53 and 56 at a timing T51, so that the first and fourth switching elements 53 and 56 are in the OFF-state concurrently. At this time, since an exciting energy of the transformer 62 has of a continuous characteristic, a secondary current of the transformer 62 is divided into two paths; one in the first secondary winding 62b and the other in the second secondary winding 62c. Consequently, the first and second rectifying diodes 63 and 64 are in the conductive state, so that the induced voltage of the first and second secondary windings 62b and 62c fall to zero. Thereby, the output voltage Vout is applied to the inductance element 18 reversely.

After this, the control circuit 57 outputs the control signals g2 and g3 to the respective second and third switching elements 54 and 55 at a timing T52, so that the second and third switching elements 54 and 55 are in the ON-state concurrently. Consequently, a voltage (−Vin) is thus applied to the primary winding 62a, so that the induced voltage (Vin/n) is generated in the second secondary winding 62c. As a result, the first rectifying diode 63 is in the non-conductive state, and the second rectifying diode 64 is in the conductive state. The inductance element 65 receives the voltage (Vin/n−Vout) because the output voltage Vout is already applied to the inductance element 65 from the smoothing capacitor 66.

On the other hand, a current is the sum of an exciting current of the transformer 62 and a converted component current, which is the component such that an exciting current of the inductance element 65 is converted into the current flowing through the primary winding 62a, and passes through the second and third switching elements 54 and 55.

Subsequently, the control circuit 57 outputs the control signals g2 and g3 to the respective second and third switching elements 54 and 55 at a timing T53, so that the second and third switching elements 54 and 55 are in the OFF-state concurrently. At this time, since an exciting energy of the transformer 62 has of the continuous characteristic, the secondary current of the transformer 62 is divided into two paths; one in the first secondary winding 62b and the other in the second secondary winding 62c. Consequently, the first and second rectifying diodes 63 and 64 are in the conductive state, respectively, so that the induced voltages of the first and second secondary windings 62b and 62c fall to zero. Thereby, the output voltage Vout is applied to the inductance element 65 reversely.

After this, the control circuit 57 outputs the control signals g1 and g4 to the respective first and fourth switching elements 53 and 56 at a timing T54 just like at the timing T50, so that the first and fourth switching elements 53 and 56 are in the ON-state concurrently. Consequently, the input voltage Vin is applied to the primary winding 62a, thereby the above operations are repeated in the switching power supply apparatus.

Hereafter, description will be made in detail for the ratio of the ON-period and the OFF-period of each of the first through fourth switching elements 53 . . . 56 in the conventional switching power supply apparatus.

As shown in the following equation (11), an ON-period Ton where each of the switching elements 53 . . . 56 is in the ON-state is a constant value. Further, as shown in the following equation (12), an OFF-period Toff where all of the switching elements 53 . . . 56 are in the OFF-state is a constant value.

$$\text{Ton}=T51-T50=T53-T52 \qquad (11)$$

$$\text{Toff}=T52-T51=T54-T53 \qquad (12)$$

When a reset condition of the inductance element 65 shown in the following equation (13) is satisfied, the operation of the inductance element 65 is stabilized.

$$(\text{Vin}/n-\text{Vout})\times\text{Ton}=\text{Vout}\times\text{Toff} \qquad (13)$$

This equation (13) can be modified to the following equation (15) using an equation (14).

$$\delta=\text{Ton}/(\text{Ton}+\text{Toff}) \qquad (14)$$

$$V=\delta\times\text{Vin}/n \qquad (15)$$

In the conventional switching power supply apparatus, the aforementioned ratio of the ON-period and the OFF-period is adjusted so that a value of "δ×Vin" is a constant value. Thereby, in the conventional switching power supply apparatus, even if the input voltage Vin was varied, it was possible to stabilize the output voltage Vout as shown in the equations (14) and (15).

Furthermore, in this conventional switching power supply apparatus, the full bridge converter composed of the first through fourth switching elements 53 . . . 56 and the transformer 62 was used, and further the input terminals 52a and 52b of this full bridge converter were connected to the DC power source 51. Thereby, in the conventional switching power supply apparatus, a voltage over the input voltage Vin was not applied to any of the first through fourth switching elements 53 . . . 56. In addition, since a well-balanced current is flown in the switching elements 53 . . . 56, the current stress was dispersed and accordingly, it was easy to use the converter for a switching power supply apparatus of a larger electrical power.

However, in the conventional switching power supply apparatus, it was impossible to suppress both surge voltage and surge current generated when each of the first through fourth switching elements 53 . . . 56 was switched between the ON-state and the OFF-state. Therefore, in the conventional switching power supply apparatus, there occurs problems that the surge current caused a power loss, lowering efficiency, and generating noise.

In the concrete, in this conventional switching power supply apparatus, when the first switching element 53 was in the ON-state, for example, at the timing T50 shown in FIG. 5, the first parasitic capacitance 58 was discharged and the second parasitic capacitance 59 was charged. Consequently, the current I51 contained a spike current, which was a surge current (transient current) as shown in (i) of FIG. 5. When the second switching element 54 was in the ON-state, for example, at the timing T52 shown in FIG. 5, the first parasitic capacitance 58 was charged and the second parasitic capacitance 59 was discharged. Consequently, the current I52 contained the spike current as shown in (j) of FIG. 5.

In the same way, when the third switching element 55 was in the ON-state (for example, at the timing T52), the third parasitic capacitance 60 was discharged and the fourth parasitic capacitance 61 was charged. Consequently, a current flowing in the third switching element 55 contained the spike current. When the fourth switching element 56 was in the ON-state (for example, at the timing T50), the third parasitic capacitance 60 was charged and the fourth parasitic capacitance 61 was discharged. Consequently, a current flowing in the fourth switching element 56 contained the spike current.

On the other hand, in this conventional switching power supply apparatus, when each of the first through fourth switching elements 53 ... 56 was the OFF-state, the surge voltage was generated by a leak inductance of the transformer 62 and parasitic inductance of lead wires, etc. For example, as shown in (g) of FIG. 5, after the first and fourth switching elements 53 and 56 were in the OFF-state at the timing T51, the surge voltage was generated, so that the voltage V5t to be applied to the primary winding 62a was varied. In the same way, after the second and third switching elements 54 and 55 were in the OFF-state at the timing T53, the surge voltage was generated, so that the voltage V5t to be applied to the primary winding 62a was varied.

SUMMARY OF THE INVENTION

The object of the present invention is to provide a switching power supply apparatus that can solve the aforementioned problems in the conventional switching power supply apparatus and can be configured with less cost and has a long life.

In order to achieve the above-mentioned object, the switching power supply apparatus of the present invention comprises:

first and second switching units which are connected each other serially and to a DC power source,
third and fourth switching units which are connected each other serially and to the DC power source,
a transformer including a primary winding connected to between a connecting point between the first and second switching units and a connecting point between the third and fourth switching units, and
a control circuit which controls the operation of each of the first through fourth switching units so that
the first and second switching units are in an ON-state complementarily after a first predetermined dead time period in which both of the first and second switching units are in an OFF-state,
the third and fourth switching units are in the ON-state complementarily after a second predetermined dead time period in which both of the third and fourth switching units are in the OFF-state, and
the first through four switching units shortcircuits the primary winding during the periods of the first dead time and the second dead time.

With such a configuration, the switching power supply apparatus of the present invention can suppress generation of both surge current and surge voltage, as well as power loss thereby to easily improve the efficiency. In addition, the switching power supply apparatus of the present invention can prevent generation of noises, thereby to provide a low-noise switching power supply apparatus easily.

DETAILED DESCRIPTION OF THE INVENTION

Hereafter, preferred embodiments of the present invention for a switching power supply apparatus and a controlling method for the same are described with reference to the accompanying drawings. In the below-mentioned explanation, in order to easily compare with the conventional switching power supply apparatus, the switching power supply apparatus is configured so as to include the full bridge converter.

FIRST EMBODIMENTS

Figure 1:
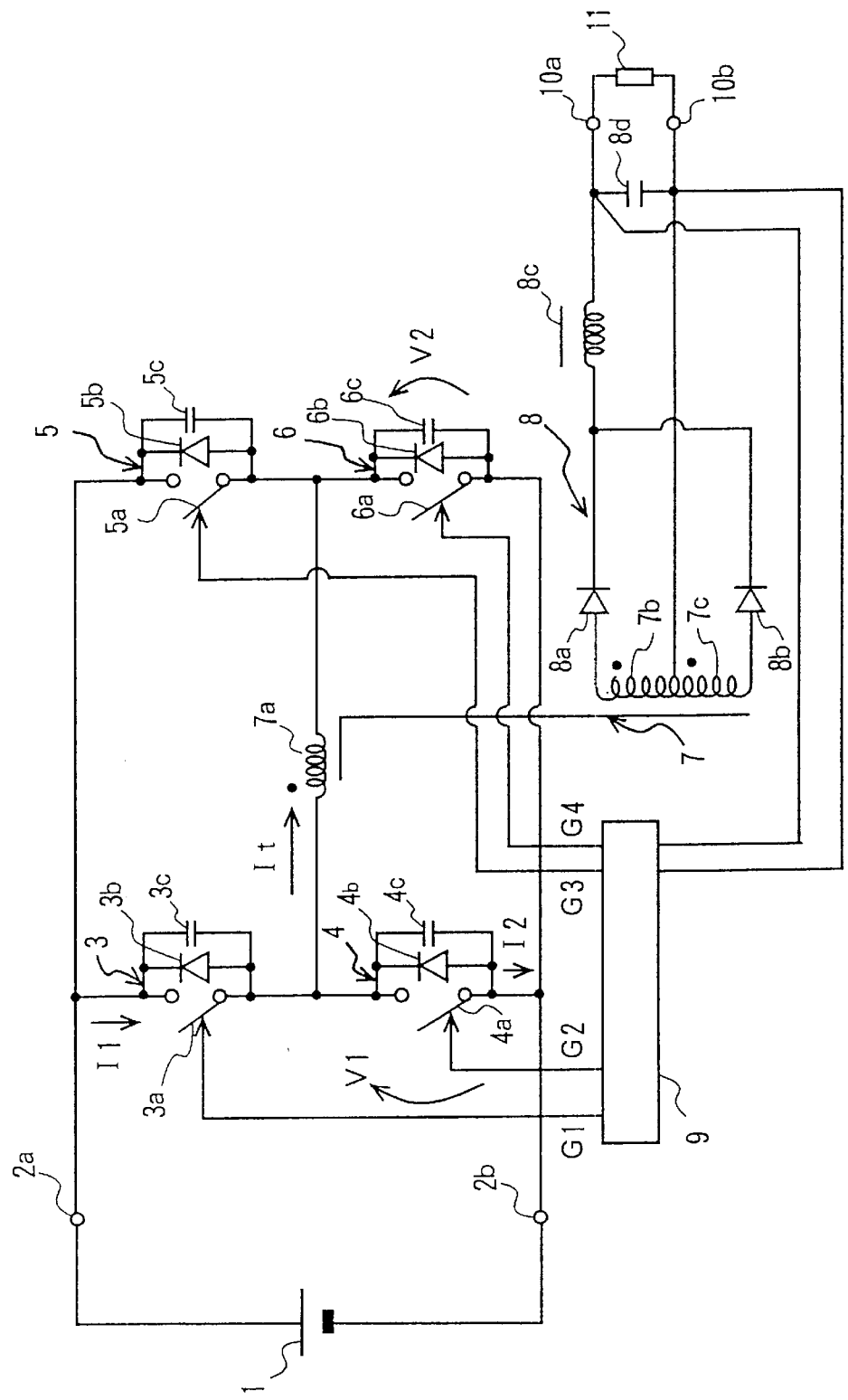
FIG. 1 is an equivalent circuit diagram showing a configuration of a switching power supply apparatus in a first embodiment of the present invention.

FIG. 1 is an equivalent circuit diagram showing a configuration of a switching power supply apparatus in a first embodiment of the present invention.

As shown in FIG. 1, the switching power supply apparatus of this embodiment comprises a DC power source 1 for supplying an input voltage VIN, input terminals 2a and 2b connected to a positive electrode and a negative electrode of the DC power source 1, respectively, and first, second, third, and fourth switching units 3, 4, 5, and 6 connected in a bridge connection. Furthermore, the switching power supply apparatus of this embodiment has a transformer 7 including a primary winding 7a, and first and second secondary windings 7b and 7c, a rectifier smoothing unit 8 connected to the first and second secondary windings 7b and 7c and for smoothing an induced voltage generated in the first and second secondary windings 7b and 7c, and a control circuit 9 for controlling each of the first through fourth switching units 3 ... 6.

The first and second switching units 3 and 4 are connected to each other serially. The first and second switching units 3 and 4 are connected across the input terminals 2a and 2b. Similarly, the third and fourth switching units 5 and 6 are connected to each other serially. The third and fourth switching units 5 and 6 are connected across the input terminals 2a and 2b.

The first switching unit 3 comprises a first switching element 3a to be operated by a control signal G1 output from the control circuit 9, and a first diode 3b connected to the first switching element 3a in parallel so as to set in the reverse direction for the DC power source 1. In addition, the first switching unit 3 includes a first parasitic capacitance 3c being parasitic on both the first switching element 3a and the first diode 3b. This first parasitic capacitance 3c grows across the first switching element 3a and the first diode 3b in parallel.

The second switching unit 4 comprises a second switching element 4a to be operated by a control signal G2 output from the control circuit 9, and a second diode 4b connected to the second switching element 4a in parallel so as to set in the reverse direction for the DC power source 1. In addition, the second switching unit 4 includes a second parasitic capacitance 4c being parasitic on both the second switching element 4a and the second diode 4b. This second parasitic capacitance 4c grows across the second switching element 4a and the second diode 4b in parallel.

The third switching unit 5 comprises a third switching element 5a to be operated by a control signal G3 output from the control circuit 9, and a third diode 5b connected to the third switching element 5a in parallel so as to set in the reverse direction for the DC power source 1. The third switching unit 5 includes the third parasitic capacitance 5c being parasitic on both the third switching element 5a and the third diode 5b. This third parasitic capacitance 5c grows across the third switching element 5a and the third diode 5b in parallel.

The fourth switching unit 6 comprises a fourth switching element 6a to be operated by a control signal G4 output from the control circuit 9, and a fourth diode 6b connected to the fourth switching element 6a in parallel so as to set in the reverse direction for the DC power source 1. The fourth switching unit 6 includes the fourth parasitic capacitance 6c being parasitic on both the fourth switching element 6a and the fourth diode 6b. This fourth parasitic capacitance 6c grows across the fourth switching element 6a and the fourth diode 6b in parallel.

The first through fourth switching elements 3a, 4a, 5a, and 6a should preferably be configured with a semiconductor element, for example, a bipolar transistor or a MOSFET. Especially, in the case that each of the switching units 3 . . . 6 is configured with the MOSFET, the above-mentioned diodes 3b, 4b, 5b, or 6b are not needed, because the MOSFET has a built-in diode connected in parallel therewith in the same package.

In the transformer 7, the primary winding 7a, the first and second secondary windings 7b and 7c are set at turn ratio of N:1:1. One end of the primary winding 7a is connected to a connecting point between the first and second switching units 3 and 4, and the other end is connected to a connecting point between the third and fourth switching units 5 and 6.

The rectifier smoothing unit 8 comprises a first rectifying diode 8a connected to the first secondary winding 7b in the forward direction, a second rectifying diode 8b connected to the second secondary winding 7c in the forward direction, an inductance element 8c connected to the first and second rectifying diodes 8a and 8b at its one end, and a smoothing capacitor 8d connected to the other end of the inductance element 8c at its one end and to the connecting point between the first and second secondary windings 7b and 7c at the other end. Thereby, the rectifier smoothing unit 8 rectifies and smooths the induced voltage generated in at least one of the first and second secondary windings 7b and 7c, and supplies an output voltage VOUT to a load 11 connected to both ends of the smoothing capacitor 8d via output terminals 9a and 9b.

The control circuit 9 detects the output voltage VOUT generated at both ends of the smoothing capacitor 8d, thereby to control the operation of each of the first through fourth switching elements 3a, 4a, 5a, and 6a so as to fix the level of the output voltage VOUT. In the concrete, the control circuit 9 outputs the control signals G1 and G2 to the respective first and second switching elements 3a and 4a so that both of the first and second switching elements 3a and 4a are in an ON-state complementarily in a first predetermined minute dead time period in which both the first and second switching elements 3a and 4a are in an OFF-state. In the same way, the control circuit 9 outputs the control signals G3 and G4 to the respective third and fourth switching elements 5a and 6a so that both of the third and fourth switching elements 5a and 6a are in the ON-state complementarily in a second predetermined minute dead time period in which both the third and fourth switching elements 5a and 6a are in the OFF-state.

Furthermore, the control circuit 9 controls the first through fourth switching elements 3a, 4a, 5a, and 6a so that a short-circuited time period in which the primary winding 7a is short-circuited is provided between the first and second dead time periods. Specifically, the control circuit 9 outputs the control signals G2 and G4 to the respective second and fourth switching elements 4a and 6a so that a time period, in which the second and fourth switching elements 4a and 6a are in the ON-state, is provided between the first and second dead time periods. Thereby, the primary winding 7a is short-circuited during the first and second dead time periods.

With such a configuration as described above, in the switching power supply apparatus of this embodiment, it is possible to hold energy stored in a leakage inductance and an exciting inductance of the transformer 7 during the short-circuited time period of the primary winding 7a. Furthermore, in the switching power supply apparatus of this embodiment, it is possible to charge and discharge the first through fourth parasitic capacitances 3c, 4c, 5c, and 6c in the first and second dead periods. As a result, the switching power supply apparatus of this embodiment can suppress a surge current to be generated when each of the first through fourth switching elements 3a, 4a, 5a, and 6a is in the ON-state (to be described later more in detail).

Furthermore, each of the first through fourth switching elements 3a, 4a, 5a, and 6a is connected to the corresponding one of the first through fourth diodes 3b, 4b, 5b, and 6b. Consequently, in the switching power supply apparatus of this embodiment, it is possible to clamp a surge voltage to be generated when each of the first through fourth switching elements 3a, 4a, 5a and 6a is in the OFF-state more effectively. Thereby, the switching power supply apparatus of this embodiment can prevent generation of such a surge voltage.

Hereafter, operation of the switching power supply apparatus will be explained with reference to FIGS. 1 and 2.

Figure 2:
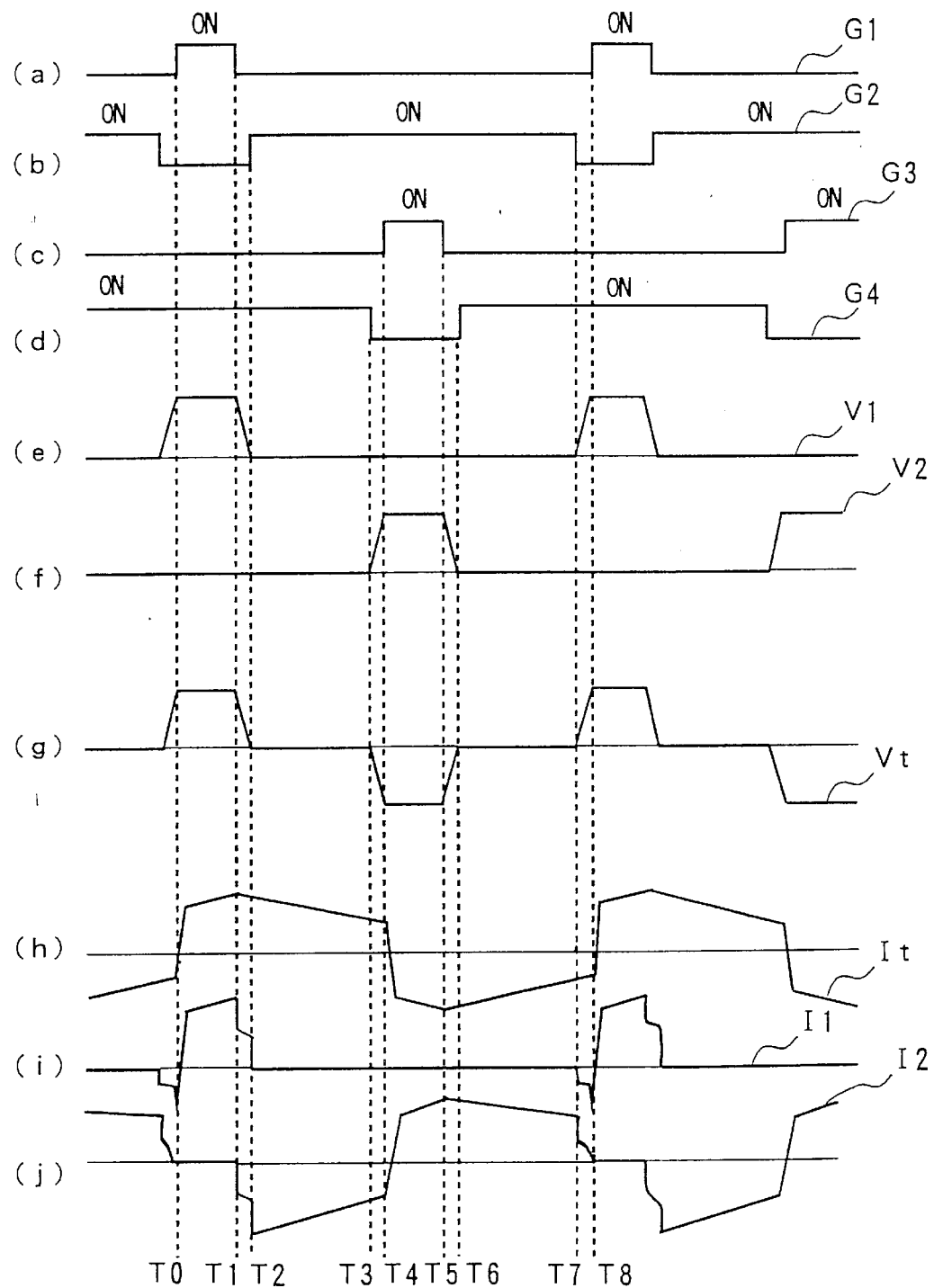
FIG. 2 is a waveform chart showing a pulse waveform of each control signal, and voltage and current waveforms at operating condition of the switching power supply apparatus shown in FIG. 1.

FIG. 2 is a waveform chart showing a pulse waveform of each control signal, and voltage and current waveforms at operating condition of the switching power supply apparatus shown in FIG. 1. In (a) through (j) of FIG. 2, abscissa is graduated with time. In (a) through (j) of FIG. 2, the respective waveforms are drawn with their timing positions (represented by vertical broken lines) in agreement with each other.

In (a) through (d) of FIG. 2, the pulse waveforms indicate the control signals G1 . . . G4, respectively. A voltage V1 in (e) of FIG. 2 indicates the waveform of a voltage applied to the second switching unit 4. A voltage V2 in (f) of FIG. 2 indicates the waveform of a voltage applied to the fourth switching unit 6. A voltage Vt in (g) of FIG. 2 indicates the waveform of a voltage applied to the primary winding 7a. A current It in (h) of FIG. 2 indicates the waveform of a current flowing in the primary winding 7a. A current I1 in (i) of FIG. 2 indicates the waveform of a current flowing in the first switching unit 3. A current I2 in (j) of FIG. 2 indicates the waveform of a current flowing in the second switching unit 4.

The control circuit 9 outputs the control signal G1 to the first switching element 3a at a timing T0 of FIG. 2, so that the first switching element 3a is turned to the ON-state. At this time, since the fourth switching element 6a is already in the ON-state, the input voltage VIN is supplied to the primary winding 7a from the DC power source 1. As a result, the induced voltage (VIN/N) is generated in the first secondary winding 7b, and thereby the first rectifying diode 8a is turned to a conductive state. At this time, an output voltage VOUT is applied to the inductance element 8c from the smoothing capacitor 8d. Accordingly, a voltage (VIN/N−VOUT) is applied to the inductance element 8c. After this, a current flowing in the inductance element 8c is increased linearly.

The current It flowing in the primary winding 7a is the sum of an exciting current of the transformer 7 and a converted component current, which is the component such that a current flowing in the first secondary winding 7b is converted into the current flowing through the primary winding 7a. Consequently, the above-mentioned current It is increased linearly as shown in (h) of FIG. 2. The exciting energy is thus stored both in the transformer 7 and in the inductance element 8c. At this time, the control circuit 9 turns off both the second and third switching elements 4a and 5a and turns on the fourth switching element 6a. However, since the second and third diodes 5b and 6b are connected reversely with respect to the DC power source 1, the input voltage VIN is biased to the second and third diodes 5b and 6b reversely. Therefore, the second and third diodes 5b and 6b turn to a non-conductive state, and thereby the second and third switching units 4 and 5 do not affect any circuit operation.

Subsequently, the control circuit 9 outputs the control signal G1 to the first switching element 3a at a timing T1, so that the first switching element 3a is turned to the OFF-state. At this time, the current It flowing in the primary winding 7a keeps flowing affected by the leakage inductance of the transformer 7 continuously. Consequently, the first parasitic capacitance 3c is charged and the second parasitic capacitance 4c is discharged. Thereby, the voltage V1 applied to the second switching unit 4 is reduced gradually to reach zero at a timing T2, and the second diode 4b is turned to the conductive state. When the second diode 4b becomes in the conductive state at this timing T2, the control circuit 9 outputs the control signal G2 to the second switching element 4a, so that the second switching element 4a is turned to the ON-state. That is, the control circuit 9 turns on the second switching element 4a at the timing T2 after the first dead time period started at the timing T1. When the control circuit 9 turns on the second switching element 4a at this timing T2, no operation change occurs whether the current I2 flowing in the second switching unit 4 flows in the second diode 4b or in the second switching element 4a.

The fourth switching element 6a is already in the ON-state at this timing T2 . Therefore, when the second diode 4b turns to in the conductive state and the second switching element 4a turns to in the ON-state, the current It flowing in the primary winding 7a passes through the fourth switching element 6a and the second diode 4b or the second switching element 4a. As a result, the primary winding 7a is short-circuited, so that the energy stored in both the leakage inductance and the exciting inductance of the transformer 7 is held.

When the primary winding 7a is short-circuited, the induced voltages generated in the first and second windings 7b and 7c fall to zero, and the voltage applied to the inductance element 8c becomes an inverse output voltage VOUT with respect to the smoothing capacitor 8d. As a result, a current is divided and flown into the first and second secondary windings 7b and 7c so as to hold continuously the exciting energy. Consequently, both first and second rectifying diodes 8a and 8b are turned to the conductive state.

After this, the control circuit 9 outputs the control signal G4 to the fourth switching element 6a at a timing T3, so that the fourth switching element 6a is turned to the OFF-state. As a result, the third parasitic capacitance 5c is discharged and the fourth parasitic capacitance 6c is charged by the energy held in the transformer 7. Thereby, the voltage V2 applied to the fourth switching unit 6 increases gradually to reach the input voltage VIN at a timing T4, and the third diode 5b is turned to the conductive state. When this third diode 5b becomes in the conductive state at the timing T4, the control circuit 9 outputs the control signal G3 to the third switching element 5a, so that the third switching element 5a is turned to the ON-state. That is, the control circuit 9 turns on the third switching element 5a at the timing T4 after the second dead time period started at the timing T3. When the third switching element 5a turns to in the ON-state at this timing T4, no operation change occurs whether the current flowing in the third switching unit 5 flows in the third diode 5b or in the third switching element 5a.

The second switching element 4a is already in the ON-state at the timing T4. Therefore, when the third switching element 5a turns to the ON-state, the current It flowing in the primary winding 7a passes through the second and third switching elements 4a and 5a. As a result, an inverse input voltage (−VIN) is applied to the primary winding 7a, and thereby the current It flowing in the primary winding 7a is reduced sharply. After this, an inverse current is sufficiently supplied to the primary winding 7a, then the first rectifying diode 8a turns to the non-conductive state, and the induced voltage (VIN/N) is generated in the second secondary winding 7c. Consequently, the voltage (VIN/N−VOUT) is applied to the inductance element 8c, and thereby the current flowing in the inductance element 8c is increased linearly. Accordingly, the current It is reduced linearly because the current It flowing in the primary winding 7a becomes the sum of the exciting current of the transformer 7 and a converted component current, which is the component such that a current flowing in the second secondary winding 7c is converted into the current flowing through the primary winding 7a. Thereby, the exciting energy is stored in both the transformer 7 and the inductance element 8c. At this time, the control circuit 9 turns off the first and fourth switching elements 3a and 6a and turns on the second switching element 4a. However, since the first and fourth diodes 3b and 6b are connected reversely with respect to the DC power source 1, the input voltage VIN is biased to the first and fourth diodes 3b and 6b reversely. Therefore, the first and fourth diodes 3b and 6b turn to the non-conductive state, and thereby the first and fourth switching units 3 and 6 do not affect any circuit operation.

Subsequently, the control circuit 9 outputs the control signal G3 to the third switching element 5a at a timing T5, so that the third switching element 5a is turned to the OFF-state. As a result, the current It flowing in the primary winding 7a keeps flowing affected by the leakage inductance of the transformer 7 continuously. Consequently, the third parasitic capacitance 5c is charged and the fourth parasitic capacitance 6c is discharged. Thereby, the voltage V2 applied to the fourth switching 6 is reduced gradually to reach zero at a timing T6, and the fourth diode 6b is turned to the conductive state. When the fourth diode 6b becomes in the conductive state at this timing T6, the control circuit 9 outputs the control signal G4 to the fourth switching element 6a, so that the fourth switching element 6a is turned to the ON-state. That is, the control circuit 9 turns on the fourth switching element 6a at the timing T6 after the second dead time period started at the timing T5. At this timing T6, when the fourth switching element 6a turns to the ON-state, no operation change occurs whether the current flowing in the fourth switching unit 6 flows in the fourth diode 6b or in the fourth switching element 6a.

The second switching element 4a is already in the ON-state at this timing T6. Therefore, when the fourth switching element 6a turns to the ON-state, the current It flowing in the primary winding 7a flows in the second switching element 4a and in the fourth switching element 6a. As a result, the primary winding 7a is short-circuited, so that the energy stored in both the leakage inductance and the exiting inductance of the transformer 7 is held.

When the primary winding 7a is short-circuited, the induced voltages generated in the first and second secondary windings 7b and 7c fall to zero, and the voltage applied to the inductance element 8c becomes the inverse output voltage with respect to the smoothing capacitor 8d. As a result, the current is divided and flown into the first and second secondary windings 7b and 7c so as to hold continuously the exciting energy. Consequently, both first and second rectifying diodes 8a and 8b turn to the conductive state.

After this, the control circuit 9 outputs the control signal G2 to the second switching element 4a at the timing T7, so that the second switching element 4a is turned to the OFF-state. As a result, the first parasitic capacitance 3c is discharged and the second parasitic capacitance 4c is charged by the energy held in the transformer 7. Thereby, the voltage V1 applied to the second switching unit 4 increases gradually to reach the input voltage VIN at a timing T8, and the first diode 3b is turned to the conductive state. When the first diode 3b becomes in the conductive state at the timing T8, the control circuit 9 outputs the control signal G1 to the first switching element 3a, so that the first switching element 3a is turned to the ON-state. That is, the control circuit 9 turns on the first switching element 3a at the timing T8 after the first dead time period started at the timing T7. At the timing T8, when the first switching element 3a turns to the ON-state, no operation change occurs whether the current I1 flowing in the first switching unit 3 flows in the first diode 3b or in the first switching element 3a.

The fourth switching element 6a is already in the ON-state at the timing T8. Therefore, when the first switching element 3a turns to the ON-state, the current It flowing in the primary winding 7a passes through the first switching element 3a and the fourth switching element 6a. Consequently, the input voltage VIN is applied to the primary winding 7a, so that the current It in the primary winding 7a is increased sharply. After this, when the current It is supplied enough to the primary winding 7a, the second rectifying diode 8b is turned to the non-conductive state, and thereby the induced voltage (VIN/N) is generated in the first secondary winding 7b. Consequently, the voltage (VIN/N−VOUT) is applied to the inductance element 8c, so that the current is increased linearly in the inductance element 8c. Accordingly, the current It is reduced linearly because the current It flowing in the primary winding 7a becomes the sum of the exciting current of the transformer 7 and a converted component current, which is the component such that a current flowing in the first secondary winding 7b is converted into the current flowing through the primary winding 7a. Thereby, the exciting energy is stored in both the transformer 7 and the inductance element 8c. At this time, the control circuit 9 turns off the second and third switching elements 4a and 5a and turns on the first and fourth switching elements 3a and 6a. However, since the second and third diodes 4b and 5b are connected reversely with respect to the DC power source 1, the input voltage VIN is biased to the second and third diodes 4b and 5b reversely. Therefore, the second and third diodes 4b and 5b turn to the non-conductive state, and thereby the second and third switching units 4 and 5 do not affect any circuit operation. Hereafter, the switching power supply apparatus of this embodiment repeats the above operations.

Hereafter, description will be made in detail for the ratio of the ON-period and the OFF-period of each of the first through fourth switching units 3 . . . 6 in the switching power supply apparatus in this embodiment.

In the below-mentioned description, it is premised that the ON-period TON is equal in both the first and third switching units 3 and 5. It is also premised that the OFF-period TOFF between when the first switching unit 3 is in the OFF-state and when the third switching unit 5 is in the ON-state is equal to the OFF-period TOFF between when the third switching unit 5 is in the OFF-state and when the first switching unit 3 is in the ON-state. It is further premised that the first dead time period (T1 . . . T2, T7 . . . T8) and the second dead time period (T3 . . . T4, T5 . . . T6) do not affect any operation of the second and fourth switching units 4 and 6, since those periods are short.

The following equation (1) is established from the condition for resetting the inductance element 8c.

$$(VIN/N - VOUT) \times TON = VOUT \times TOFF \qquad (1)$$

By using the below-mentioned equation (2), the equation (1) can be changed to the equation (3) as follows:

$$\delta = TON/(TON + TOFF) \qquad (2)$$

$$VOUT = \delta \times VIN/N \qquad (3)$$

As understood from the equations (2) and (3), in the switching power supply apparatus of this embodiment, in the switching power supply apparatus of this embodiment, it is possible to control the output voltage VOUT by adjusting the ratio of the ON-period and the OFF-period of each of the first and third switching units 3 and 5. In the switching power supply apparatus of this embodiment, the input voltage VIN is converted to the output voltage VOUT as shown in the equation (3) using the same conversion equation as that of a conventional full bridge converter. In this case, the output voltage VOUT is lower than the conventional one when the first and second dead time periods are taken into consideration. However, in the switching power supply apparatus of this embodiment, a predetermined output voltage VOUT can be obtained by increasing the δ value shown in the equation (2).

Furthermore, in the switching power supply apparatus of this embodiment, the control circuit 9 controls such that the ON-state and the OFF-state setting timings of the first switching unit 3 are shifted by a half switching cycle from the ON-state and the OFF-state setting timings of the third switching unit 5, respectively. Specifically, the control circuit 9 controls the switching operations of the first and third A switching units 3 and 5 so that the period between T0 to T8 becomes double the period between T0 and T4 shown in FIG. 2. Consequently, the input voltage VIN is supplied to the primary winding 7a at equal intervals so that the VIN is reversed in supply alternately. As a result, in switching power supply apparatus of this embodiment, the induced voltage can be generated in the first and second secondary windings 7b and 7c in a well balanced manner.

As described in the above, in the switching power supply apparatus of this embodiment, the control circuit 9 controls the first through fourth switching elements 3a, 4a, 5a, and 6a so that the short-circuited time period in which the primary winding 7a is short-circuited is disposed between the first and second dead time periods. Thereby, it is possible to hold the energy stored in the leakage inductance and the exciting inductance of the transformer 7 during the short-circuited time period of the primary winding 7a. Furthermore, it is possible to charge or discharge each of the first to fourth parasitic capacitances 3c, 4c, 5c, and 6c by the energy stored before the corresponding switching elements 3a, 4a, 5a, and 6a are in the ON-state. Consequently, the switching power supply apparatus of this embodiment can reduce gene of a surge-like short-circuiting current (surge current), and thereby to improve the efficiency and to suppress gene of noises.

Furthermore, in the switching power supply apparatus of this embodiment, it is possible to clamp a surge voltage caused by the leakage inductance of the transformer 7 effectively when the first and second switching elements 3a and 4a are in the OFF-state by turning on the second and first diodes 4b and 3b, respectively. Thereby, it is prevented that the surge voltage is applied to the primary winding 7a. Similarly, in the switching power supply apparatus of this embodiment it is possible to clamp the surge voltage caused by the leakage inductance of the transformer 7 effectively when the third and fourth switching elements 5a and 6a are in the OFF-state by turning on the fourth and third diodes 6b and 5b, respectively. Thereby, it is prevented that the surge voltage is applied to the primary winding 7a. Accordingly, the switching power supply apparatus in this embodiment can prevent the surge voltage from gene in the output voltage VOUT.

As described above, each of the first through fourth parasitic capacitances 3c, 4c, 5c, and 6c is charged or discharged by the energy stored in the leakage inductance of the transformer 7. However, it is also possible to connect an inductance element to the primary winding 7a or the first secondary winding 7b of the transformer 7 serially, and thereby to increase the discharge energy of each of the parasitic capacitances 3c, 4c, 5c, and 6c. It is also possible to reduce the inductance value of the transformer 7 and excite the transformer reversely, and thereby to promote discharging of the first and second parasitic capacitances 3c and 4c and the distributed capacity of the transformer 7.

Furthermore, the input voltage VIN is the maximum voltage applied to each of the switching units 3 . . . 6. The transformer 7 is not excited one way for a DC voltage. Consequently, the switching power supply apparatus of this embodiment having a high efficiency, low noise and a high switching frequency is realizable.

SECOND EMBOGIMENT

Figure 3:
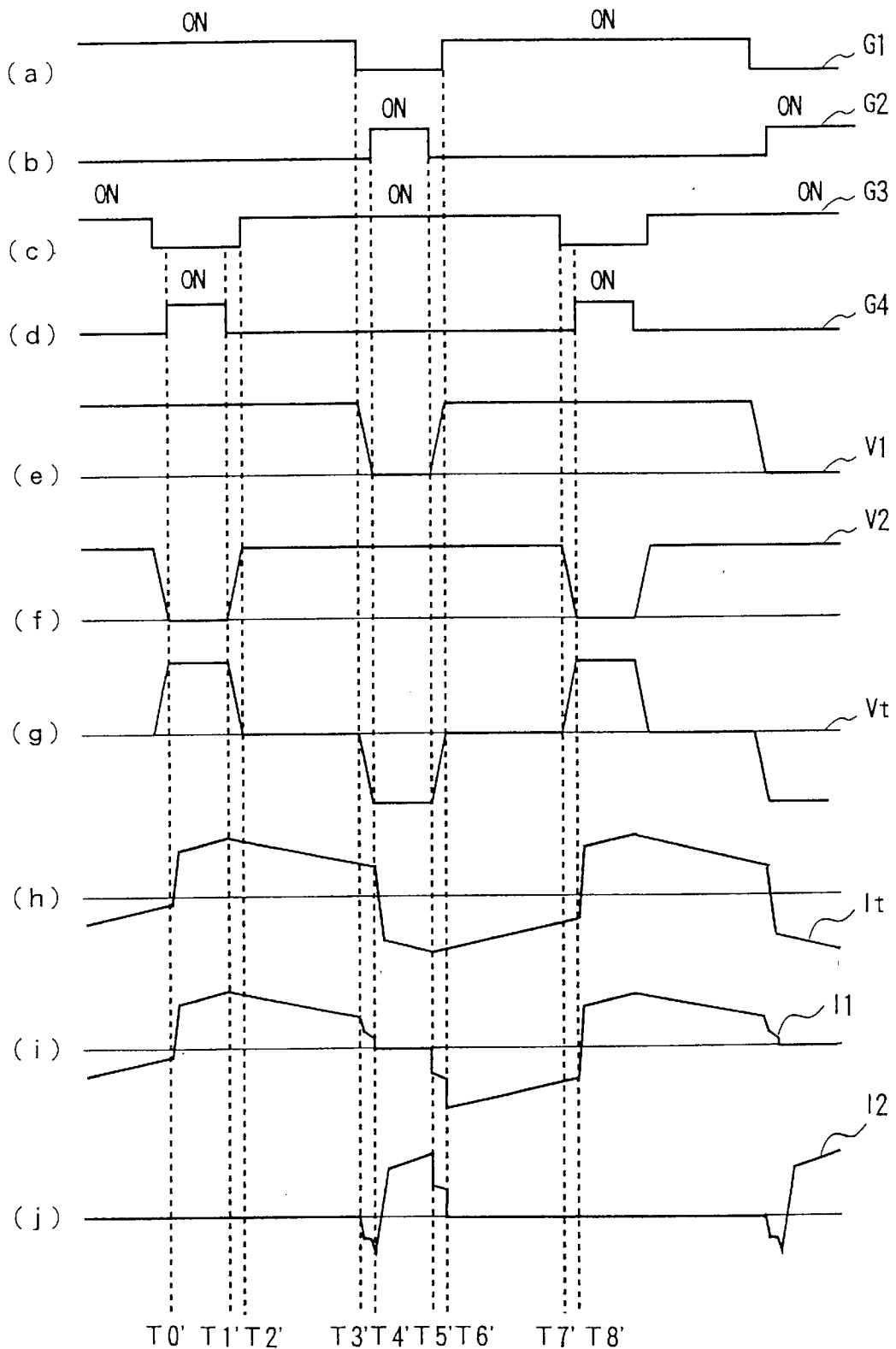
FIG. 3 is a waveform chart showing a pulse waveform of each control signal, and voltage and current waveforms at operating condition of a switching power supply apparatus in a second embodiment of the present invention.
Figure 4:
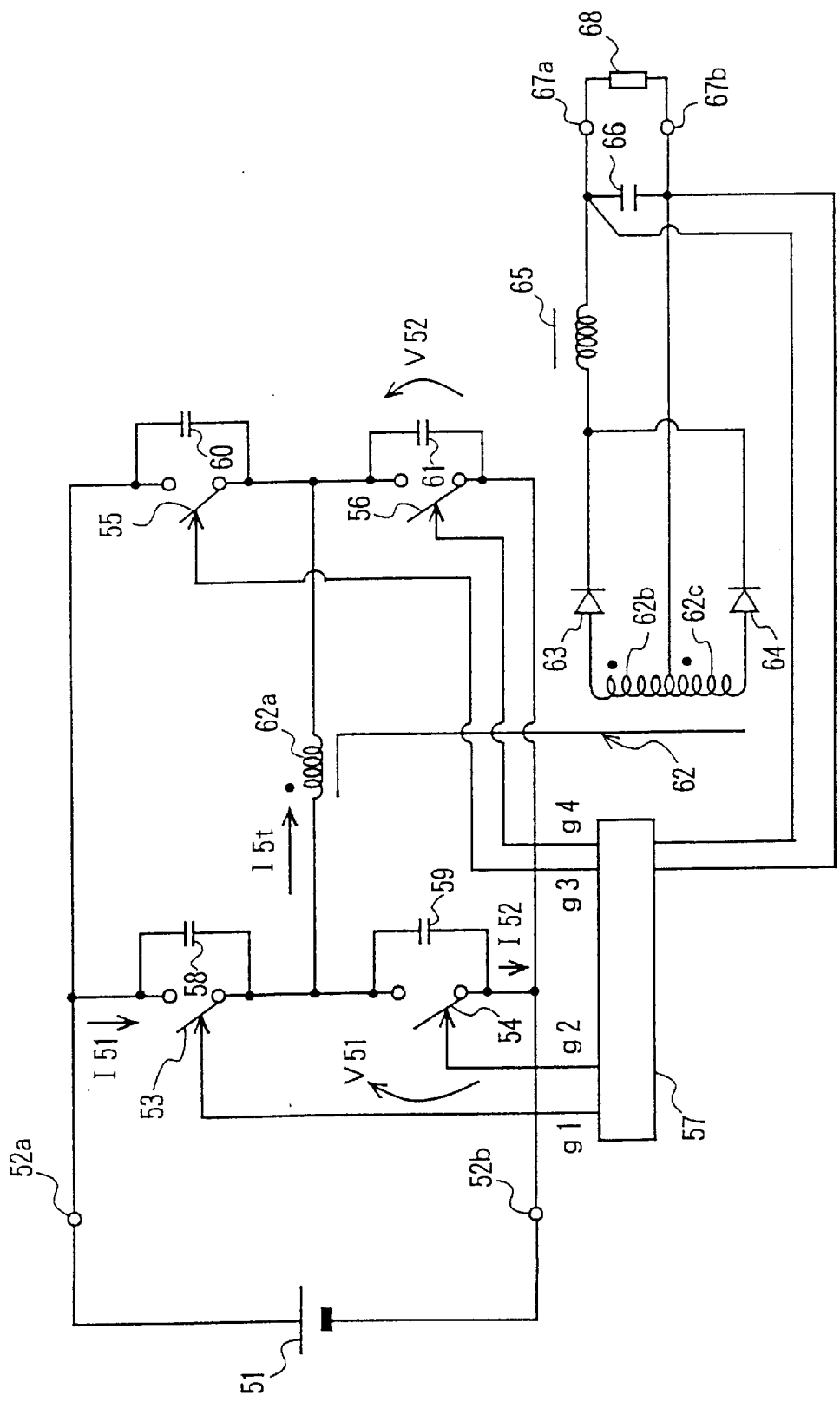
FIG. 4 is an equivalent circuit diagram showing a configuration of a conventional switching power supply apparatus.
Figure 5:
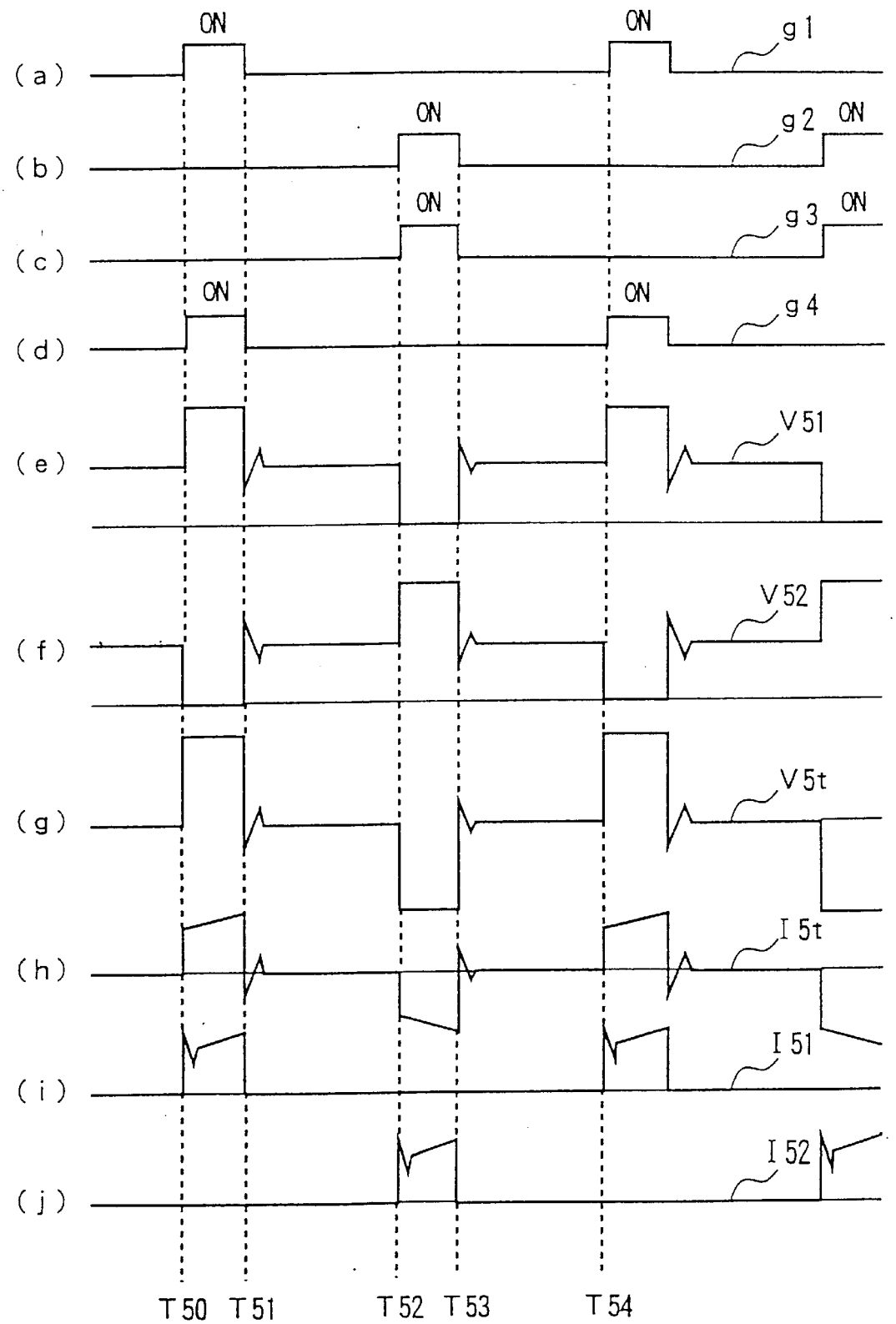
FIG. 5 is a waveform chart showing a pulse waveform of each control signal, and voltage and current waveforms at operating condition of the conventional switching power supply apparatus shown in FIG. 4.

FIG. 3 is a waveform chart showing a pulse waveform of each control signal, and voltage and current waveforms at operating condition of a switching power supply apparatus in a second embodiment of the present invention.

In the switching power supply apparatus of this embodiment, the first and third switching elements are controlled so that a time period, in which the first and third switching elements are in the ON-state, is disposed between the first and second dead time periods. The other elements and portions are similar to those of the first embodiment and will not be described.

In (a) through (d) of FIG. 3, the pulse waveforms indicate the control signals G1 . . . G4, respectively. A voltage V1 in (e) of FIG. 3 indicates the waveform of a voltage applied to the second switching unit 4. A voltage V2 in (f) of FIG. 3 indicates the waveform of a voltage applied to the fourth switching unit 6. A voltage Vt in (g) of FIG. 3 indicates the waveform of a voltage applied to the primary winding 7a. A current It in (h) of FIG. 3 indicates the waveform of a current flowing in the primary winding 7a. A current I1 in (i) of FIG. 3 indicates the waveform of a current flowing in the first switching unit 3. A current I2 in (j) of FIG. 3 indicates the waveform of a current flowing in the second switching unit 4. In (a) through (j) of FIG. 2, abscissa is graduated with time. In (a) through (j) of FIG. 2, the respective waveforms are drawn with their timing positions (represented by vertical broken lines) in agreement with each other.

Hereafter, operation of the switching power supply apparatus will be explained with reference to FIGS. 1 and 3.

The control circuit 9 outputs the control signal G4 to the fourth switching element 6a at a timing T0' of FIG. 3, so that the fourth switching element 6a is turned to the ON-state. At this time, since the first switching element 3a is already in the ON-state, the input voltage VIN is supplied to the primary winding 7a from the DC power source 1. As a result, the induced voltage (VIN/N) is generated in the first secondary winding 7b, and thereby the first rectifying diode 8a is turned to the conductive state. At this time, an output voltage VOUT is applied to the inductance element 8c from the smoothing capacitor 8d. Accordingly, a voltage (VIN/N–VOUT) is applied to the inductance element 8c. After this, a current flowing in the inductance element 8c is increased linearly.

The current It flowing in the primary winding 7a is the sum of an exciting current of the transformer 7 and a converted component current, which is the component such that the current flowing in the first secondary winding 7b is converted into the current flowing through the primary winding 7a. Consequently, the above-mentioned current It is increased linearly as shown in (h) of FIG. 3. The exciting energy is thus stored both in the transformer 7 and in the inductance element 8c. At this time, the control circuit 9 turns off both the second and third switching elements 4a and 5a and turns on the first and fourth switching elements 3a and 6a. However, since the second and third diodes 5b and 6b are connected reversely with respect to the DC power source 1, the input voltage VIN is biased to the second and third diodes 5b and 6b reversely. Therefore, the second and third diodes 5b and 6b turn to the non-conductive state, and thereby the second and third switching units 4 and 5 do not affect any circuit operation.

Subsequently, the control circuit 9 outputs the control signal G4 to the fourth switching element 6a at a timing T1', so that the fourth switching element 6a is turned to the OFF-state. At this time, the current It flowing in the primary winding 7a keeps flowing affected by the leakage inductance of the transformer 7 continuously. Consequently, the fourth parasitic capacitance 6c is charged and the third parasitic capacitance 5c is discharged. Thereby, the voltage V2 applied to the fourth switching unit 6 is increased gradually to reach the input voltage VIN at a timing T2', and the third diode 5b is turned to the conductive state. When the third diode 5b becomes in the conductive state at this timing T2', the control circuit 9 outputs the control signal G3 to the third switching element 5a, so that the third switching element 5a is turned to the ON-state. That is, the control circuit 9 turns on the third switching element 5a at the timing T2' after the second dead time period started at the timing T1'. When the control circuit 9 turns on the third switching element 5a at this timing T2', no operation change occurs whether the current flowing in the third switching unit 5 flows in the third diode 5b or in the third switching element 5a.

The first switching element 3a is already in the ON-state at this timing T2'. Therefore, when the third diode 5b turns to the conductive state and the third switching element 5a turns to in the ON-state, the current It flowing in the primary winding 7a passes through the first switching element 3a and the third diode 5b or the third switching element 5a. As a result, the primary winding 7a is short-circuited, so that the energy stored in both the leakage inductance and the exciting inductance of the transformer 7 is held.

When the primary winding 7a is short-circuited, the induced voltages generated in the first and second windings 7b and 7c fall to zero, and the voltage applied to the inductance element 8c becomes an inverse output voltage VOUT with respect to the smoothing capacitor 8d. As a result, a current is divided and flown into the first and second secondary windings 7b and 7c so as to hold continuously the exciting energy. Consequently, both first and second rectifying diodes 8a and 8b are turned to the conductive state.

After this, the control circuit 9 outputs the control signal G1 to the first switching element 3a at a timing T3', so that the first switching element 3a is turned to the OFF-state. As a result, the second parasitic capacitance 4c is discharged and the first parasitic capacitance 3c is charged by the energy held in the transformer 7. Thereby, the voltage V1 applied to the second switching unit 3 decreases gradually to reach zero at a timing T4', and the second diode 4b is turned to the conductive state. When this second diode 4b becomes in the conductive state at the timing T4', the control circuit 9 outputs the control signal G2 to the second switching element 4a, so that the second switching element 4a is turned to the ON-state. That is, the control circuit 9 turns on the second switching element 4a at the timing T4' after the first dead time period started at the timing T3'. When the second switching element 4a turns to the ON-state at this timing T4', no operation change occurs whether the current flowing in the second switching unit 4 flows in the second diode 4b or in the second switching element 4a.

The third switching element 5a is already in the ON-state at the timing T4'. Therefore, when the second switching element 4a is turned to the ON-state, the current It flowing in the primary winding 7a passes through the second and third switching elements 4a and 5a. As a result, the inverse input voltage (−VIN) is applied to the primary winding 7a, and thereby the current It flowing in the primary winding 7a is reduced sharply. After this, the inverse current is sufficiently supplied to the primary winding 7a, then the first rectifying diode 8a turns to the non-conductive state, and the induced voltage (VIN/N) is generated in the second secondary winding 7c. Consequently, the voltage (VIN/N−VOUT) is applied to the inductance element 8c, and thereby the current flowing in the inductance element 8c is increased linearly. Accordingly, the current It is reduced linearly because the current It flowing in the primary winding 7a becomes the sum of the exciting current of the transformer 7 and a converted component current, which is the component such that a current flowing in the second secondary winding 7c is converted into the current flowing through the primary winding 7a. Thereby, the exciting energy is stored in both the transformer 7 and the inductance element 8c. At this time, the control circuit 9 turns off the first and fourth switching elements 3a and 6a and turns on the second switching element 4a. However, since the first and fourth diodes 3b and 6b are connected reversely with respect to the DC power source 1, the input voltage VIN is biased to the first and fourth diodes 3b and 6b reversely. Therefore, the first and fourth diodes 3b and 6b turn to the non-conductive state, and thereby the first and fourth switching units 3 and 6 do not affect any circuit operation.

Subsequently, the control circuit 9 outputs the control signal G2 to the second switching element 4a at a timing T5', so that the second switching element 4a is turned to the OFF-state. As a result, the current It flowing in the primary winding 7a keeps flowing affected by the leakage inductance of the transformer 7 continuously.

Consequently, the second parasitic capacitance 4c is charged and the first parasitic capacitance 3c is discharged. Thereby, the voltage V1 applied to the second switching 4 is increased gradually to reach the input voltage VIN at a timing T6', and the first diode 3b turns to the conductive state. When the first diode 3b becomes in the conductive state at this timing T6', the control circuit 9 outputs the control signal G1 to the first switching element 3a, so that the first switching element 3a is turned to the ON-state. That is, the control circuit 9 turns on the first switching element 3a at the timing T6' after the first dead time period started at the timing T5'. At this timing T6', when the first switching element 3a turns to the ON-state, no operation change occurs whether the current flowing in the first switching unit 3 flows in the first diode 3b or in the first switching element 3a.

The third switching element 5a is already in the ON-state at this timing T6'. Therefore, when the first switching element 3a turns to the ON-state, the current It flowing in the primary winding 7a flows in the first switching element 3a and in the third switching element 5a. As a result, the primary winding 7a is short-circuited, so that the energy stored in both the leakage inductance and the exiting inductance of the transformer 7 is held.

When the primary winding 7a is short-circuited, the induced voltages generated in the first and second secondary windings 7b and 7c fall to zero, and the voltage applied to the inductance element 8c becomes the inverse output voltage with respect to the smoothing capacitor 8d. As a result, the current is divided and flown into the first and second secondary windings 7b and 7c so as to hold continuously the exciting energy. Consequently, both first and second rectifying diodes 8a and 8b turn to the conductive state.

After this, the control circuit 9 outputs the control signal G3 to the third switching element 5a at the timing T7', so that the third switching element 5a is turned to the OFF-state. As a result, the fourth parasitic capacitance 6c is discharged and the third parasitic capacitance 5c is charged by the energy held in the transformer 7. Thereby, the voltage V2 applied to the fourth switching unit 6 decreases gradually to reach zero at a timing T8', and the fourth diode 6b is turned to the conductive state. When the fourth diode 6b becomes in the conductive state at the timing T8', the control circuit 9 outputs the control signal G4 to the fourth switching element 6a, so that the fourth switching element 6a is turned to the ON-state. That is, the control circuit 9 turns on the fourth switching element 6a at the timing T8' after the second dead time period started at the timing T7'. At the timing T8', when the fourth switching element 6a turns to the ON-state, no operation change occurs whether the current flowing in the fourth switching unit 6 flows in the fourth diode 6b or in the fourth switching element 6a.

The first switching element 3a is already in the ON-state at the timing T8'. Therefore, when the fourth switching element 6a is in the ON-state, the current It flowing in the primary winding 7a passes through the first switching element 3a and the fourth switching element 6a. Consequently, the input voltage VIN is applied to the primary winding 7a, so that the current It in the primary winding 7a is increased sharply. After this, when the current It is supplied enough to the primary winding 7a, the second rectifying diode 8b is turned to the non-conductive state, and thereby the induced voltage (VIN/N) is generated in the first secondary winding 7b. Consequently, the voltage (VIN/N−VOUT) is applied to the inductance element 8c, so that the current is increased linearly in the inductance element 8c. Accordingly, the current It is reduced linearly because the current It flowing in the primary winding 7a becomes the sum of the exciting current of the transformer 7 and a converted component current, which is the component such that a current flowing in the first secondary winding 7b is converted into the current flowing through the primary winding 7a. Thereby, the exciting energy is stored in both the transformer 7 and the inductance element 8c. At this time, the control circuit 9 turns off the second and third switching elements 4a and 5a and turns on the first and fourth switching elements 3a and 6a. However, since the second and third diodes 4b and 5b are connected reversely with respect to the DC power source 1, the input voltage VIN is biased to the second and third diodes 4b and 5b reversely. Therefore, the second and third diodes 4b and 5b turn to the non-conductive state, and thereby the second and third switching units 4 and 5 do not affect any circuit operation. Hereafter, the switching power supply apparatus of this embodiment repeats the above operations.

With the operations as described above, the switching power supply apparatus in this embodiment can obtain the same effect as that in the first embodiment.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

I claim:

1. A switching power supply apparatus comprising:

first and second switching units which are connected each other serially and to a DC power source, third and fourth switching units which are connected each other serially and to said DC power source, a transformer including a primary winding connected to between a connecting point between said first and second switching units and a connecting point between said third and fourth switching units, and a control circuit which controls the operation of each of said first through fourth switching units so that said first and second switching units are in an ON-state complementarily after a first predetermined dead time period in which both of said first and second switching units are in an OFF-state, said third and fourth switching units are in the ON-state complementarily after a second predetermined dead time period in which both of said third and fourth switching units are in the OFF-state, and said first through four switching units shortcircuits said primary winding during the periods of said first dead time and second dead time.

2. A switching power supply apparatus in accordance with claim 1, wherein said second and fourth switching units are controlled to be in the ON-state so that said primary winding is short-circuited.

3. A switching power supply apparatus in accordance with claim 1, wherein said first and third switching units are controlled to be in the ON-state so that said primary winding is short-circuited.

4. A switching power supply apparatus in accordance with claim 1, wherein said first and third switching units are operated so as to shift said ON-state and said OFF-state setting timings of said first switching unit by a half switching cycle from said ON-state and said OFF-state setting timings of said third switching unit, respectively.

5. A switching power supply apparatus in accordance with claim 1, wherein each of said first through fourth switching units is configured with a switching element and a diode connected to said switching element in parallel so as to connect in a reverse direction for said DC power source.

6. A switching power supply apparatus in accordance with claim 1, wherein each of said first through fourth switching units is composed of a MOSFET.

7. A method for controlling a switching power supply apparatus comprising first and second switching units connected each other serially and to a DC power source; third and fourth switching units connected each other serially and to said DC power source; and a transformer including a primary winding connected to between a connecting point between said first and second switching units and a connecting point between said third and fourth switching units; the method comprising the steps of controlling said first and second switching units so that said first and second switching units are in an ON-state complementarily after a first predetermined dead time period in which both of said first and second switching units are in an OFF-state, controlling said third and fourth switching units so that said third and fourth switching units are in the ON-state complementarily after a second predetermined dead time period in which both of said third and fourth switching units are in the OFF-state, and short-circuiting said primary winding during the periods of said first dead time and second dead time.

* * * * *